United States Patent
Liu et al.

(10) Patent No.: US 11,786,861 B2
(45) Date of Patent: Oct. 17, 2023

(54) HIGH SELECTIVITY POLYIMIDE/PES BLEND HOLLOW FIBER MEMBRANE FOR GAS SEPARATIONS

(71) Applicant: UOP LLC, Des Plaines, IL (US)

(72) Inventors: Chunqing Liu, Arlington Heights, IL (US); Xueliang Dong, Schaumburg, IL (US); Jeremy Nolan Webb, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 212 days.

(21) Appl. No.: 17/121,384

(22) Filed: Dec. 14, 2020

(65) Prior Publication Data

US 2022/0184550 A1 Jun. 16, 2022

(51) Int. Cl.
| | |
|---|---|
| *B01D 53/22* | (2006.01) |
| *B01D 71/64* | (2006.01) |
| *B01D 71/68* | (2006.01) |
| *B01D 69/02* | (2006.01) |
| *B01D 69/08* | (2006.01) |
| *B01D 69/12* | (2006.01) |
| *B01D 67/00* | (2006.01) |
| *C08J 5/18* | (2006.01) |
| *C10L 3/10* | (2006.01) |
| *B01D 61/36* | (2006.01) |

(52) U.S. Cl.
CPC ......... *B01D 53/228* (2013.01); *B01D 61/362* (2013.01); *B01D 67/009* (2013.01); *B01D 67/0083* (2013.01); *B01D 67/0088* (2013.01); *B01D 67/0095* (2013.01); *B01D 69/02* (2013.01); *B01D 69/085* (2013.01); *B01D 69/087* (2013.01); *B01D 69/125* (2013.01); *B01D 71/64* (2013.01); *B01D 71/68* (2013.01); *C08J 5/18* (2013.01); *C10L 3/103* (2013.01); *C10L 3/104* (2013.01); *B01D 2053/224* (2013.01); *B01D 2323/22* (2013.01); *B01D 2323/30* (2013.01); *B01D 2325/022* (2013.01); *B01D 2325/20* (2013.01); *C08J 2379/08* (2013.01); *C08J 2381/06* (2013.01); *C08J 2479/08* (2013.01); *C08J 2481/06* (2013.01); *C10L 2290/548* (2013.01)

(58) Field of Classification Search
CPC ............... B01D 67/0088; B01D 2325/20; B01D 71/64; B01D 69/085; B01D 71/68; B01D 67/0083; B01D 2325/022; B01D 53/228; B01D 69/125; B01D 69/087; B01D 61/362; B01D 67/0095; B01D 2053/224; B01D 69/02; B01D 2323/30; B01D 2323/22; B01D 67/009; C08J 5/18; C08J 2379/08; C08J 2479/08; C08J 2381/06; C08J 2481/06; C10L 3/103; C10L 3/104; C10L 2290/548
See application file for complete search history.

(56) References Cited

U.S. PATENT DOCUMENTS

| | | | |
|---|---|---|---|
| 7,422,623 B2 | 9/2008 | Ekiner et al. | |
| 7,803,214 B2 | 9/2010 | Kase et al. | |
| 10,851,241 B2 * | 12/2020 | Moore | .................... C08L 81/06 |
| 2006/0011063 A1 | 1/2006 | Zhou | |
| 2009/0297850 A1 | 12/2009 | Jung et al. | |
| 2012/0322646 A1 * | 12/2012 | Liu | .................... C08G 73/1067 502/4 |
| 2016/0317981 A1 * | 11/2016 | Ungerank | .......... C08G 73/1021 |
| 2019/0015792 A1 * | 1/2019 | Lin | ........................ B01D 69/10 |
| 2020/0030752 A1 * | 1/2020 | Ho | ......................... B01D 71/32 |
| 2021/0370239 A1 * | 12/2021 | Kharul | ............... B01D 67/0088 |

FOREIGN PATENT DOCUMENTS

WO   WO-2016178835 A1 * 11/2016 ......... B01D 67/0016

OTHER PUBLICATIONS

Written Opinion of the International Searching Authority PCT/US2021/062642, dated Apr. 14, 2022, 7 pages (Year: 2022).*
Chung et al., Effect of Air-Gap Distance on the Morphology and Thermal Properties of Polyethersulfone Hollow Fibers, Journal of Applied Polymer Science, vol. 666, 1067-1077 (1997), John Wiley & Sons, Inc.
Chung et al., Breaking the limitation of composition change during isothermal mass-transfer processes at the spinodal, Journal of Membrane Science 130 (1997) 141-147, Elsevier Science B.V.
Chung, The limitations of using Flory-Huggins equation for the states of solutions during asymmetric hollow-fiber formation, Journal of Membrane Science 126 (1997) 19-34, Elsevier Science B.V.

* cited by examiner

*Primary Examiner* — Anthony R Shumate
(74) *Attorney, Agent, or Firm* — Paschall & Associates, LLC; Mark Goldberg

(57) ABSTRACT

A low cost, high selectivity asymmetric polyimide/polyethersulfone (PES) blend hollow fiber membrane, a method of making the membrane and its use for a variety of liquid, gas, and vapor separations such as deep desulfurization of gasoline and diesel fuels, ethanol/water separations, pervaporation dehydration of aqueous/organic mixtures, $CO_2/CH_4$, $CO_2/N_2$, $H_2/CH_4$, $He/CH_4$, $O_2/N_2$, $H_2S/CH_4$, olefin/paraffin, iso/normal paraffins separations, and other light gas mixture separations. The polyimide/PES blend hollow fiber membrane is fabricated from a blend of a polyimide polymer and PES and showed surprisingly unique gas separation property with higher selectivities than either the polyimide hollow fiber membrane without PES polymer or the PES hollow fiber membrane without PES polymer for gas separations such as for $H_2/CH_4$, $He/CH_4$, $H_2S/CH_4$, $CO_2/CH_4$ separations.

7 Claims, No Drawings

HIGH SELECTIVITY POLYIMIDE/PES BLEND HOLLOW FIBER MEMBRANE FOR GAS SEPARATIONS

BACKGROUND OF THE INVENTION

This invention relates to gas separation membranes and more particularly to a new low cost, high selectivity asymmetric polyimide/polyethersulfone (PES) blend hollow fiber membrane for gas separations such as $H_2$ recovery, helium recovery, biogas purification, $CO_2$ removal from natural gas, and air separation.

In the past 40-45 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ spiral wound polymeric membrane technology is currently an international market leader for carbon dioxide removal from natural gas.

Polymers provide a range of properties including low cost, permeability, mechanical stability, and ease of processability that are important for gas separation. Glassy polymers (i.e., polymers at temperatures below their Tg) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability. High performance polymers such as polyimides (PIs), poly(trimethylsilylpropyne), and polytriazole have been developed to improve membrane selectivity, permeability, and thermal stability. These polymeric membrane materials have shown promising intrinsic properties for separation of gas pairs such as $CO_2/CH_4$, $O_2/N_2$, $H2/CH_4$, $He/CH_4$, and propylene/propane ($C_3H_6/C_3H_8$).

The membranes most commonly used in commercial gas and liquid separation applications are asymmetric polymeric membranes and have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The PA is the product of the gas flux and the selective skin layer thickness of the membrane, divided by the pressure difference across the membrane. The $\alpha_{A/B}$ is the ratio of the permeability coefficients of two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

A particular use for gas separation membranes is for hydrogen purification in refineries or hydrogen separation in syngas processes. Useful membranes for $H_2$ separation must have sufficient selectivity to distinguish between $H_2$ and other gas molecules and must also have high permeance. Since permeance determines the size and weight of the membrane separation module and selectivity determines the purity of the product gas. Normally, $H_2$ separation membranes are in the form of hollow fiber and are formed into hollow fiber modules. Hollow fiber polymer membranes used for gas separations particularly for air or $H_2$ separation have the advantages of low cost, high area packing density, good flexibility, and self-mechanical support. However, fabrication of hollow fiber membranes with both superior permeance and selectivity is always a challenge due to the complexity of spinning process. Hollow fiber polymer membranes with integrally skinned asymmetric membrane structure are normally fabricated by a dry-wet phase inversion technique. There are three major steps in manufacturing hollow fiber polymer membranes including spinning dope preparation, spinning, and coagulation (or phase inversion) using this technique. Chung et al. reported that air-gap distance and elongational stress played important roles on the hollow fiber formation and the mass-transfer fluxes and spinodal decomposition in Markoffian and Onsager's thermodynamic systems. Work reported by Chung et al. also suggested that the main parameters affecting hollow fiber formation are rheological properties of spinning solution, bore fluid chemistry and flow rate, external coagulant chemistry, spinning dope chemistry and flow rate, fiber take-up rate, shear stress within an annular orifice of the spinneret, spinneret design parameters, and spinneret temperature. See Chung, J. Membr. Sci., 1997, 126, 19; Chung, Teoh, J. Membr. Sci., 1997, 130, 141; Chung, Hu, J. Appl. Polym. Sci., 1997, 66, 1067.

US 2006/0011063 disclosed a gas separation membrane formed from polyetherimide by extruding a hollow fiber using a core liquid. For the described membrane, as with other asymmetric hollow fiber membranes, one polymer solution is spun from an annular spinneret and the core liquid is pumped into the center of the annulus.

U.S. Pat. No. 7,803,214 B2 disclosed an asymmetric hollow-fiber polyimide gas separation membrane, an improved tensile elongation at break of 15% or more as a hollow-fiber membrane itself, an oxygen gas permeation rate of 40 GPU or more and a gas ratio of permeation rate of oxygen to nitrogen of 4 or more measured at 50° C. In addition, this work taught an asymmetric hollow fiber gas separation membrane obtained by heat-treating the asymmetric hollow fiber gas separation membrane at a maximum temperature of from 350° to 450° C. The asymmetric hollow fiber gas separation membrane has sufficient mechanical strength even after the heat-treatment at a maximum temperature of from 350° to 450° C.

US 2009/0297850 A1 disclosed a hollow fiber membrane derived from a polyimide membrane, and the polyimide includes a repeating unit obtained from aromatic diamine including at least one ortho-positioned functional group with respect to an amine group and dianhydride.

U.S. Pat. No. 7,422,623 reported the preparation of polyimide hollow fiber membranes using annealed polyimide polymers, particularly polyimide polymers with low molecular weight sold under the trade name P84. The polyimide polymers are annealed at high temperature from 140° to 180° C. for about 6 to 10 hours to improve the mechanical properties of the polymers. The resulting membranes prepared from the high temperature annealed polyimides are suitable for high pressure applications. This polymer annealing method, however, is not suitable for high molecular weight, easily thermally crosslinkable, or easily thermally decomposed polymer membrane materials.

The present invention provides a new low cost, high selectivity asymmetric polyimide/polyethersulfone (PES) blend hollow fiber membrane and a method of making the membrane.

SUMMARY OF THE INVENTION

This invention pertains to a new low cost, high selectivity asymmetric polyimide/PES blend hollow fiber membrane and a method of making the membrane.

The present invention provides a new low cost, high selectivity asymmetric polyimide/PES blend hollow fiber membrane for $H_2$ purification, biogas purification, or acid gas removal from natural gas. The polyimide/PES blend hollow fiber membrane described in the present invention is fabricated from a blend of polyethersulfone (PES) polymer and a polyimide polymer comprising a plurality of repeating units of formula (I)

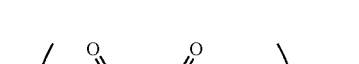

wherein X is

or a mixture of

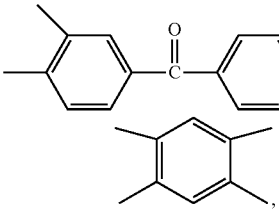

and wherein Y is a mixture of

and

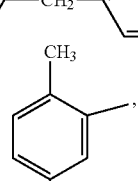

, a mixture of

and

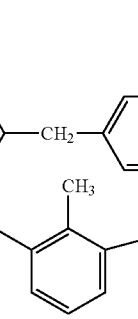

, or a mixture of

,

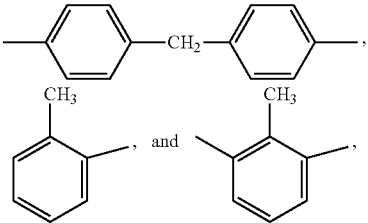

, and and wherein n is an integer from 20 to 2000. Some examples of the polyimide polymers comprising a plurality of repeating units of formula (I) may include, but are not limited to poly(3,3',4,4'-benzophenone tetracarboxylic dianhydride-4,4'-methylenedianiline-2,4-toluenediamine) polyimide synthesized from 3,3',4,4'-benzophenone tetracarboxylic dianhydride (BTDA), 4,4'-methylenedianiline (MDA), and 2,4-toluenediamine (2,4-TDA) monomers and the molar ratio of MDA to 2,4-TDA diamines is in a range of 1:10 to 10:1, poly(3,3',4,4'-benzophenone tetracarboxylic dianhydride-4,4'-methylenedianiline-2,4-toluenediamine-2,6-toluenediamine) polyimide synthesized from BTDA, MDA, 2,4-TDA, and 2,6-toluenediamine (2,6-TDA) monomers and the molar ratio of MDA to 2,4-TDA to 2,6-TDA diamines is in a range of 1:5:5 to 10:1:1, poly(3,3',4,4'-benzophenone tetracarboxylic dianhydride-pyromellitic dianhydride-4,4'-methylenedianiline-2,4-toluenediamine) polyimide synthesized from BTDA, pyromellitic dianhydride (PMDA), MDA, and 2,4-TDA monomers and the molar ratio of BTDA to PMDA dianhydrides is in a range of 1:10 to 10:1 and the molar ratio of MDA to 2,4-TDA diamines is in a range of 1:10 to 10:1, poly(3,3',4,4'-benzophenone tetracarboxylic dianhydride-4,4'-methylene diphenyl diisocyanate-toluene-2,4-diisocyanate) polyimide synthesized from BTDA, 4,4'-methylene diphenyl diisocyanate (MDI), and toluene-2,4-diisocyanate (2,4-TDI) monomers and the molar ratio of MDI to 2,4-TDI diisocyanates is in a range of 1:10 to 10:1, poly(3,3',4,4'-benzophenone tetracarboxylic dianhydride-pyromellitic dianhydride-4,4'-methylene diphenyl diisocyanate-toluene-2,4-diisocyanate) polyimide synthesized from BTDA, PMDA, MDI, and 2,4-TDI and the molar ratio of BTDA to PMDA dianhydrides is in a range of 1:10 to 10:1 and the molar ratio of MDI to 2,4-TDI diisocyanates is in a range of 1:10 to 10:1, and poly(3,3',4,4'-benzophenone tetracarboxylic dianhydride-4,4'-methylene diphenyl diisocyanate-toluene-2,4-diisocyanate-toluene-2,6-diisocyanate) polyimide synthesized from BTDA, MDI, 2,4-TDI, and toluene-2,6-diisocyanate (2,6-TDI) monomers and the molar ratio of MDI to 2,4-TDI to 2,6-TDI diisocyanates is in a range of 1:5:5 to 10:1:1. The polyimide polymer comprising a plurality of repeating units of formula (I) in the current invention and PES can form molecular level blends at any weight ratio without phase separation. PES polymer has higher intrinsic gas permeabilities than the polyimide polymer comprising a plurality of repeating units of formula (I), therefore the addition of PES polymer to the polyimide polymer comprising a plurality of repeating units of formula (I) provides a new polyimide/PES blend membrane with higher intrinsic gas permeability than the polyimide polymer comprising a plurality of repeating units of formula (I). Furthermore, the new polyimide/PES blend membrane comprising the polyimide polymer comprising a plurality of repeating units of formula (I) showed surprisingly unique separation property with higher selectivities than either the polyimide polymer membrane comprising a plurality of repeating units of formula (I) or the PES polymer membrane for gas separations particularly for $H_2/CH_4$, $He/CH_4$, $H_2S/CH_4$, and $CO_2/CH_4$ separations. The weight ratio of the polyimide polymer comprising a plurality of repeating units of formula (I) to PES in the polyimide/PES blend hollow fiber membrane can be in a range of 5:1 to 1:5. The polyimide/PES blend spinning dope formulation comprises N-methylpyrrolidone (NMP) and 1,3-dioxolane. The new asymmetric polyimide/PES blend hollow fiber membrane described in the current invention has an asymmetric integrally skinned membrane structure comprising a thin selective skin layer on top of a porous support layer from the same polyimide/PES blend material.

The spinning dope formulation for the preparation of the polyimide/PES blend hollow fiber membrane for gas separations in the present invention comprises N-methylpyrrolidone (NMP) and 1,3-dioxolane which are good solvents for the polyimide polymer comprising a plurality of repeating units of formula (I) and PES polymer. In some cases, the spinning dope formulation for the preparation of the polyimide/PES blend hollow fiber membrane for gas separations in the present invention also comprises acetone and isopropanol which are poor solvents for the polyimide polymer comprising a plurality of repeating units of formula (I) and PES polymer. It is believed that the proper weight ratio of the solvents used in the present invention provides the polyimide/PES blend hollow fiber membrane with <50 nm super thin selective skin layer which results in high permeance and high selectivity.

The new high selectivity polyimide/PES blend hollow fiber membrane described herein have an asymmetric integrally skinned membrane structure. In some cases, the selective skin layer surface of the polyimide/PES blend hollow fiber membrane is coated with a thin layer of material such as a polysiloxane, a fluoropolymer, a thermally curable silicone rubber, or a UV radiation curable silicone rubber.

A process is provided for separating at least one gas from a mixture of gases using the new polyimide/PES blend hollow fiber membrane comprising the polyimide polymer comprising a plurality of repeating units of formula (I), the process comprising: (a) providing a polyimide/PES blend hollow fiber membrane described in the present invention which is permeable to said at least one gas; (b) contacting the mixture on one side of the polyimide/PES blend hollow fiber membrane described in the present invention to cause said at least one gas to permeate the membrane; and (c) removing from the opposite side of the membrane a permeate gas composition comprising a portion of said at least one gas which permeated said membrane.

The new polyimide/PES blend hollow fiber membrane is suitable for a variety of liquid, gas, and vapor separations such as non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $He/CH_4$, $O_2/N_2$, $H_2S/CH_4$, olefin/paraffin, iso/normal paraffins separations, and other light gas mixture separations.

DETAILED DESCRIPTION OF THE INVENTION

The use of membranes for separation of both gases and liquids is a growing technological area with potentially high economic reward due to the low energy requirements and the potential for scaling up of modular membrane designs. Advances in membrane technology, with the continuing development of new membrane materials and new methods for the production of high-performance membranes will make this technology even more competitive with traditional, high-energy intensive and costly processes such as distillation. Among the applications for commercial gas separation membrane systems are nitrogen enrichment, oxygen enrichment, hydrogen recovery, removal of hydrogen sulfide and carbon dioxide from natural gas, biogas purification to remove acid gases, and dehydration of air and natural gas. Also, various hydrocarbon separations are potential applications for the appropriate membrane system. The membranes that are used in these applications must have high selectivity, durability, and productivity in order to be economically successful. Membranes for gas separations have evolved rapidly in the past 40-45 years due to their easy processability for scale-up and low energy requirements. Membrane gas separation is of special interest to petroleum producers and refiners, chemical companies, and industrial gas suppliers. Several applications of membrane gas separation have achieved commercial success, including nitrogen enrichment from air, carbon dioxide removal from natural gas and biogas and in enhanced oil recovery. The United States produces more than 70 million tons of organic waste each year. Organic wastes generate large amounts of methane as they decompose. Methane is a powerful greenhouse gas and will absorb 86 times more heat in 20 years than $CO_2$. To reduce greenhouse gas emissions and the risk of pollution to waterways, organic waste can be removed and used to produce biogas, a renewable source of energy. United States currently has about 2,200 operating biogas systems, representing less than 20 percent of the total potential. The biogas feedstocks include food waste, landfill gas, livestock waste, wastewater treatment, and crop residues and normally contain about 30-40% $CO_2$. Membrane technology together with other gas treating technologies can be used for the removal of $CO_2$ and $H_2S$ from pre-treated biogas to produce purified renewable natural gas.

The present invention provides a new low cost, high selectivity asymmetric polyimide/PES blend hollow fiber membrane and a method of making the membrane. This invention also pertains to the application of asymmetric polyimide/PES blend hollow fiber membrane for a variety of low pressure and high pressure gas separations such as acid gas such as $CO_2$ and $H_2S$ removal from natural gas or biogas ($CO_2/H_2S/CH_4$), $CO_2$ removal from flue gas ($CO_2/N_2$), olefin/paraffin separations (e.g. propylene/propane separation), $H_2$ purification ($H_2/CH_4$), He recovery ($He/CH_4$), air separation ($O_2/N_2$), iso/normal paraffins, polar molecules such as $H_2O$, $H_2S$, and $NH_3$/mixtures with $CH_4$, $N_2$, $H_2$, and other light gases separations.

The polyimide/PES blend hollow fiber membrane described in the present invention comprises a blend of polyethersulfone (PES) and a polyimide comprising a plurality of repeating units of formula (I)

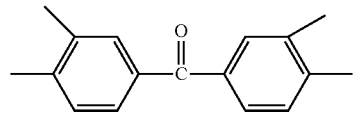
(I)

wherein X is

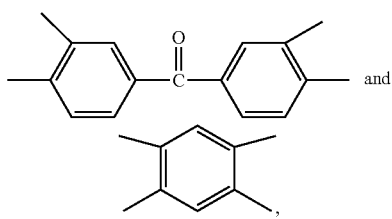

or a mixture of

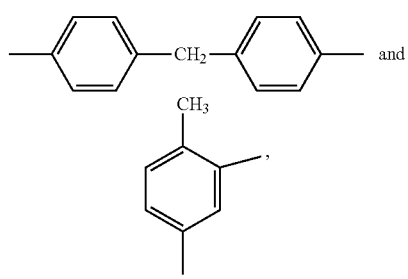

and
wherein Y is a mixture of

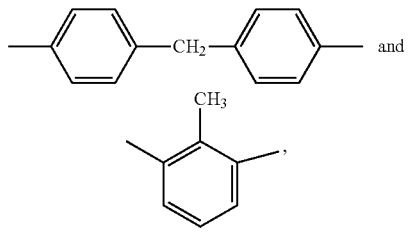

a mixture of and or a mixture of and and wherein n is an integer from 20 to 2000.

Some examples of the polyimide polymers comprising a plurality of repeating units of formula (I) may include, but are not limited to poly(3,3',4,4'-benzophenone tetracarboxylic dianhydride-4,4'-methylenedianiline-2,4-toluenediamine) polyimide synthesized from 3,3',4,4'-benzophenone tetracarboxylic dianhydride (BTDA), 4,4'-methylenedianiline (MDA), and 2,4-toluenediamine (2,4-TDA) monomers and the molar ratio of MDA to 2,4-TDA diamines is in a range of 1:10 to 10:1, poly(3,3',4,4'-benzophenone tetracarboxylic dianhydride-4,4'-methylenedianiline-2,4-toluenediamine-2,6-toluenediamine) polyimide synthesized from BTDA, MDA, 2,4-TDA, and 2,6-toluenediamine (2,6-TDA) monomers and the molar ratio of MDA to 2,4-TDA to 2,6-TDA diamines is in a range of 1:5:5 to 10:1:1, poly(3, 3',4,4'-benzophenone tetracarboxylic dianhydride-pyromellitic dianhydride-4,4'-methylenedianiline-2,4-toluenediamine) polyimide synthesized from BTDA, pyromellitic dianhydride (PMDA), MDA, and 2,4-TDA monomers and the molar ratio of BTDA to PMDA dianhydrides is in a range of 1:10 to 10:1 and the molar ratio of MDA to 2,4-TDA diamines is in a range of 1:10 to 10:1, poly(3,3',4,4'-benzophenone tetracarboxylic dianhydride-4,4'-methylene diphenyl diisocyanate-toluene-2,4-diisocyanate) polyimide synthesized from BTDA, 4,4'-methylene diphenyl diisocyanate (MDI), and toluene-2,4-diisocyanate (2,4-TDI) monomers and the molar ratio of MDI to 2,4-TDI diisocyanates is in a range of 1:10 to 10:1, poly(3,3',4,4'-benzophenone tetracarboxylic dianhydride-pyromellitic dianhydride-4,4'-methylene diphenyl diisocyanate-toluene-2,4-diisocyanate) polyimide synthesized from BTDA, PMDA, MDI, and 2,4-TDI and the molar ratio of BTDA to PMDA dianhydrides is in a range of 1:10 to 10:1 and the molar ratio of MDI to 2,4-TDI diisocyanates is in a range of 1:10 to 10:1, and poly(3,3',4,4'-benzophenone tetracarboxylic dianhydride-4,4'-methylene diphenyl diisocyanate-toluene-2,4-diisocyanate-toluene-2,6-diisocyanate) polyimide synthesized from BTDA, MDI, 2,4-TDI, and toluene-2,6-diisocyanate (2,6-TDI) monomers and the molar ratio of MDI to 2,4-TDI to 2,6-TDI diisocyanates is in a range of 1:5:5 to 10:1:1. The polyimide polymer comprising a plurality of repeating units of formula (I) in the current invention and PES can form molecular level blends at any weight ratio without phase separation. PES polymer has higher intrinsic gas permeabilities than the polyimide polymer comprising a plurality of repeating units of formula (I), therefore the addition of PES polymer to the polyimide polymer comprising a plurality of repeating units of formula (I) provides a new polyimide/PES blend with higher intrinsic gas permeability than the polyimide polymer comprising a plurality of repeating units of formula (I). Furthermore, the new polyimide/PES blend comprising the polyimide polymer comprising a plurality of repeating units of formula (I) showed surprisingly unique separation property with higher selectivities than either the polyimide polymer membrane comprising a plurality of repeating units of formula (I) or the PES polymer membrane for gas separations particularly for $H_2/CH_4$, $He/CH_4$, $H_2S/CH_4$, and $CO_2/CH_4$ separations. The weight ratio of the polyimide polymer comprising a plurality of repeating units of formula (I) to PES in the polyimide/PES blend hollow fiber membrane can be in a range of 5:1 to 1:5. The new asymmetric polyimide/PES blend hollow fiber membrane described in the current invention has an asymmetric integrally skinned membrane structure comprising a thin selective skin layer on top of a porous support layer from the same polyimide/PES blend material. The spinning dope formulation for the preparation of the polyimide/PES blend hollow fiber membrane for gas separations in the present invention comprises N-methylpyrrolidone (NMP) and 1,3-dioxolane which are good solvents for the polyimide polymer comprising a plurality of repeating units of formula (I) and PES polymer. In some cases, the spinning dope formulation for the preparation of the polyimide/PES blend hollow fiber membrane for gas separations in the present invention also comprises acetone and isopropanol which are poor solvents for the polyimide polymer comprising a plurality of repeating units of formula (I) and PES polymer. It is believed that the proper weight ratio of the solvents used in the present invention provides the polyimide/PES blend hollow fiber membrane with <50 nm super thin selective skin layer which results in high permeance and high selectivity.

The present invention provides a method for the production of the polyimide/PES blend hollow fiber membrane comprising a blend of PES and a polyimide comprising a plurality of repeating units of formula (I) by spinning the polyimide/PES blend hollow fiber spinning dope described in the present invention via a dry-wet phase inversion technique to form hollow fibers. This approach comprises: (a) dissolving PES and the polyimide comprising a plurality of repeating units of formula (I) in a mixture of NMP and 1,3-dioxolane, or a mixture of NMP, 1,3-dioxolane, and non-solvents for the polymers such as acetone, and isopropanol to form a polyimide/PES blend hollow fiber spinning dope; (b) spinning the polyimide/PES blend hollow fiber spinning dope and a bore fluid simultaneously from an annular spinneret using a hollow fiber spinning machine wherein said bore fluid is pumped into the center of the annulus and wherein said polyimide/PES blend hollow fiber spinning dope is pumped into the outer layer of the annulus; (c) passing the nascent polyimide/PES blend hollow fiber membrane through an air gap between the surface of the spinneret and the surface of the nonsolvent coagulation bath to evaporate the organic solvents for a certain time to form the nascent polyimide/PES blend hollow fiber membrane with a thin dense selective skin layer on the surface; (d) immersing the nascent polyimide/PES blend hollow fiber membrane into the nonsolvent (e.g., water) coagulation bath at a controlled temperature which is in a range of 0° to 50° C. to generate the porous non-selective support layer below the thin dense selective skin layer by phase inversion, followed by winding up the polyimide/PES blend hollow fibers on a drum, roll or other suitable device; (e) sequential solvent exchanging with methanol for one to three times and hexane for another one to three times at room temperature and each solvent exchange time is in a range of 30 min to 5 h. For some cases, the solvent exchange with hexane after methanol solvent exchange can be eliminated; (f) annealing the wet polyimide/PES blend hollow fibers in a hot water bath at a certain temperature which is in a range of 70° to 100° C. for a certain time which is in a range of 10 minutes to 3 hours; and (g) drying the polyimide/PES blend hollow fiber membrane at a certain temperature which is in a range of 50° to 100° C. It is worth noting that the order for the solvent exchanging step (e) and annealing step (f) is critical to achieve high membrane performance and prevent fire caused by flammable methanol solvent during the final membrane drying step. In some other cases a membrane post-treatment step can be added after step (g) to further improve the selectivity but does not change or damage the membrane or cause the membrane to lose performance with time. The membrane post-treatment step can involve coating the selective layer surface of the polyimide/PES blend hollow fiber membrane with a thin layer of material such as a polysiloxane, a fluoropolymer, a thermally curable silicone rubber, or a UV radiation curable silicone rubber. The polyimide/PES blend hollow fiber membrane made using this approach contains a super thin defect-free dense selective skin layer which is less than 50 nm on a porous non-selective layer and both layers are made from the same polyimide/PES blend membrane material.

The new polyimide/PES blend hollow fiber membrane with high selectivity described in the current invention has an asymmetric integrally skinned membrane structure.

In some cases, the polyimide/PES blend hollow fiber membrane undergoes an additional crosslinking step, by chemical or UV crosslinking or other crosslinking process as known to one skilled in the art. The cross-linked polyimide/PES blend hollow fiber membrane can be prepared by UV crosslinking of the polyimide/PES blend hollow fiber membrane via UV radiation. The polyimide and PES polymers used for the preparation of the polyimide/PES blend hollow fiber membrane described in the current invention have UV cross-linkable benzophenone and sulfonyl functional groups. The cross-linked polyimide/PES blend hollow fiber membrane comprises polymer chain segments where at least part of these polymer chain segments are cross-linked to each other through possible direct covalent bonds by exposure to UV radiation. The cross-linking of the polyimide/PES blend hollow fiber membrane provides the membranes with improved selectivities and slightly decreased permeances compared to the corresponding uncross-linked polyimide/PES blend hollow fiber membrane.

The new polyimide/PES blend hollow fiber membrane has high selectivities for a wide range of gas separations such as for acid gas removal from natural gas or biogas, $H_2$ recovery, He recovery, and air separations.

The invention provides a process for separating at least one gas from a mixture of gases using the new polyimide/PES blend hollow fiber membrane comprising a blend of PES and a polyimide comprising a plurality of repeating units of formula (I) described in the present invention, the process comprising: (a) providing the polyimide/PES blend hollow fiber membrane comprising a blend of PES and a polyimide comprising a plurality of repeating units of formula (I) which is permeable to said at least one gas; (b) contacting the mixture on one side of the membrane to cause said at least one gas to permeate the membrane; and (c) removing from the opposite side of the membrane a permeate gas composition comprising a portion of said at least one gas which permeated said membrane.

The polyimide/PES blend hollow fiber membrane comprising a blend of PES and a polyimide comprising a plurality of repeating units of formula (I) described in the present invention are especially useful in the purification, separation or adsorption of a particular species in the gas phase. The polyimide/PES blend hollow fiber membrane comprising a blend of PES and a polyimide comprising a plurality of repeating units of formula (I) described in the present invention is especially useful in gas separation processes in air purification, renewable energy, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ and/or $H_2S$ from natural gas or biogas, $H_2$ from $N_2$, $CH_4$, and Ar in ammonia purge gas streams, $H_2$ recovery in refineries, He recovery from natural gas, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the polyimide/PES blend hollow fiber membrane comprising a blend of PES and a polyimide comprising a plurality of repeating units of formula (I). More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the polyimide/PES blend hollow fiber membrane comprising a blend of PES and a polyimide comprising a plurality of repeating units of formula (I) will range from about −20° to about 100° C., and most preferably, the effective operating temperature of the membranes of the present invention will range from about 25° to about 100° C.

The polyimide/PES blend hollow fiber membrane comprising a blend of PES and a polyimide comprising a plurality of repeating units of formula (I) described in the present invention is also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which the polyimide/PES blend hollow fiber membrane comprising a blend of PES and a polyimide comprising a plurality of repeating units of formula (I) may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The polyimide/PES blend hollow fiber membrane comprising a blend of PES and a polyimide comprising a plurality of repeating units of formula (I) may incorporate a species that adsorbs strongly to certain gases (e.g. cobalt porphyrins or phthalocyanines for $O_2$ or silver (I) for ethane) to facilitate their transport across the membrane.

The polyimide/PES blend hollow fiber membrane comprising a blend of PES and a polyimide comprising a plurality of repeating units of formula (I) described in the present invention may also be used in the separation of liquid mixtures by pervaporation, such as in the removal of organic compounds (e. g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using the polyimide/PES blend hollow fiber membrane comprising a blend of PES and a polyimide comprising a plurality of repeating units of formula (I) is the deep desulfurization of gasoline and diesel fuels by a pervaporation membrane process similar to the process described in U.S. Pat. No. 7,048,846, incorporated by reference herein in its entirety. The polyimide/PES blend hollow fiber membrane comprising a blend of PES and a polyimide comprising a plurality of repeating units of formula (I) that is selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the polyimide/PES blend hollow fiber membrane comprising a blend of PES and a polyimide comprising a plurality of repeating units of formula (I) include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

EXAMPLES

The following examples are provided to illustrate one or more preferred embodiments of the invention but are not limited embodiments thereof. Numerous variations can be made to the following examples that lie within the scope of the invention.

Example 1

Preparation of poly(3,3',4,4'-benzophenone tetracarboxylic dianhydride-4,4'-methylene diphenyl diisocyanate-toluene-2,4-diisocyanate) polyimide (Abbreviated as BTDA-MDI-2,4-TDI)/polyethersulfone (PES) (1:1) Blend Hollow Fiber Membrane (Abbreviated as BTDA-MDI-2,4-TDI)/PES (1:1)) using BTDA-MDI-2,4-TDI and PES Polymer with a 1:1 Weight Ratio A hollow fiber spinning dope containing 16.0 wt-% of poly(3,3',4,4'-benzophenone tetracarboxylic dianhydride-4,4'-methylene diphenyl diisocyanate-toluene-2,4-diisocyanate) polyimide synthesized from 3,3',4,4'-benzophenone tetracarboxylic dianhydride (BTDA), 4,4'-methylene diphenyl diisocyanate (MDI), and toluene-2,4-diisocyanate (2,4-TDI) monomers and with 1:4 molar ratio of MDI to 2,4-TDI (abbreviated as BTDA-MDI-2,4-TDI), 16.0 wt-% of PES, 60.0 wt-% NMP, 5.8 wt-% 1,3-dioxolane, 1.1 wt-% acetone, and 1.1 wt-% isopropanol was prepared. The spinning dope was extruded at a flow rate of 4.0 mL/min through a spinneret at 35° C. spinning temperature. A bore fluid containing 20% by weight of water in NMP was injected to the bore of the fiber at a flow rate of 0.7 mL/min simultaneously with the extruding of the spinning dope. The nascent fiber traveled through an air gap length of 5 cm at room temperature with a humidity of <40%, and then was immersed into a water coagulant bath at 21° C. and wound up at a rate of 37.7 m/min. The water-wet fibers were cut into certain length and assembled together as a bundle. The water-wet hollow fiber bundle was solvent exchanged with methanol for three times and for 30 minutes each time and then was annealed in a hot water bath at 85° C. for 30 minutes. The annealed water-wet hollow fiber bundle was dried at 85° C. in an oven for 1.5 hours. The outside surface of the dried hollow fibers in the hollow fiber bundle was further coated with a thin layer of AF2400 fluoropolymer to form BTDA-MDI-2,4-TDI/PES (1:1) blend hollow fiber membrane.

Example 2

Preparation of BTDA-MDI-2,4-TDI/ PES (1:2) Blend Hollow Fiber Membrane (Abbreviated as BTDA-MDI-2,4-TDI)/PES (1:2)) Using BTDA-MDI-2,4-TDI and PES Polymer with a 1:2 Weight Ratio A hollow fiber spinning dope containing 10.7 wt-% of poly(3,3',4,4'-benzophenone tetracarboxylic dianhydride-4,4'-methylene diphenyl diisocyanate-toluene-2,4-diisocyanate) polyimide synthesized from 3,3',4,4'-benzophenone tetracarboxylic dianhydride (BTDA), 4,4'-methylene diphenyl diisocyanate (MDI), and toluene-2,4-diisocyanate (2,4-TDI) monomers and with 1:4 molar ratio of MDI to 2,4-TDI (abbreviated as BTDA-MDI-2,4-TDI), 21.3 wt-% of PES, 60.0 wt-% NMP, 5.8 wt-% 1,3-dioxolane, 1.1 wt-% acetone, and 1.1 wt-% isopropanol was prepared. The spinning dope was extruded at a flow rate of 4.0 mL/min through a spinneret at 35° C. spinning temperature. A bore fluid containing 20% by weight of water in NMP was injected to the bore of the fiber at a flow rate of 0.7 mL/min simultaneously with the extruding of the spinning dope. The nascent fiber traveled through an air gap length of 5 cm at room temperature with a humidity of <40%, and then was immersed into a water coagulant bath at 21° C. and wound up at a rate of 37.7 m/min. The water-wet fibers were cut into certain length and assembled together as a bundle. The water-wet hollow fiber bundle was solvent exchanged with methanol for three times and for 30 minutes each time and then was annealed in a hot water bath at 85° C. for 30 minutes. The annealed water-wet hollow fiber bundle was dried at 85° C. in an oven for 1.5 hours. The outside surface of the dried hollow fibers in the hollow fiber bundle was further coated with a thin layer of AF2400 fluoropolymer to form BTDA-MDI-2,4-TDI/PES (1:2) blend hollow fiber membrane.

Comparative Example 1

Preparation of BTDA-MDI-2,4-TDI Polyimide Hollow Fiber Membrane Using BTDA-MDI-2,4-TDI Polyimide The BTDA-MDI-2,4-TDI polyimide hollow fiber membrane was prepared using a hollow fiber spinning dope containing 32 wt-% of BTDA-MDI-2,4-TDI polyimide, 60.0 wt-%
NMP, 5.8 wt-% 1,3-dioxolane, 1.1 wt-% acetone, and 1.1 wt-% isopropanol and the same spinning and coating conditions as described in Example 1.

Comparative Example 2

Preparation of PES Hollow Fiber Membrane

The PES hollow fiber membrane was prepared using a hollow fiber spinning dope containing 32 wt-% of PES, 60.0 wt-% NMP, 5.8 wt-% 1,3-dioxolane, 1.1 wt-% acetone, and 1.1 wt-% isopropanol and the same spinning and coating conditions as described in Example 1.

Example 3

Evaluation of BTDA-MDI-2,4-TDI/PES (1:1), BTDA-MDI-2,4-TDI/PES (1:2), BTDA-MDI-2,4-TDI and PES Hollow Fiber Membranes for $H_2/CH_4$ Separation The BTDA-MDI-2,4-TDI/PES (1:1), BTDA-MDI-2,4-TDI/PES (1:2), BTDA-MDI-2,4-TDI and PES hollow fiber membranes prepared in Example 1, Example 2, Comparative Example 1, and Comparative Example 2, respectively, were tested for $H_2/CH_4$ separation at 50° C. under 6996 kPa (1000 psig) feed gas pressure with 10 mol % of $H_2$ and 90 mol % of $CH_4$ in the feed and the feed was introduced to the hollow fiber membrane modules from the shell side. The results are shown in Table 1. It can be seen from Table 1 that the PES hollow fiber membrane is defective with poor $H_2/CH_4$ selectivity. Both BTDA-MDI-2,4-TDI/PES (1:1) and BTDA-MDI-2,4-TDI/PES (1:2) hollow fiber membranes prepared from a blend of BTDA-MDI-2,4-TDI polyimide and PES showed higher $H_2$ permeances and higher $H_2/CH_4$ selectivities than the BTDA-MDI-2,4-TDI polyimide hollow fiber membrane without PES blending.

TABLE 1

BTDA-MDI-2,4-TDI/PES (1:1), BTDA-MDI-2,4-TDI/PES (1:2), BTDA-MDI-2,4-TDI and PES hollow fiber membranes for $H_2/CH_4$ separation

| Membrane | $H_2$ permeance (GPU) | $H_2/CH_4$ selectivity |
|---|---|---|
| PES | 221 | 3.3 |
| BTDA-MDI-2,4-TDI | 146 | 108 |
| BTDA-MDI-2,4-TDI/PES (1:1) | 213 | 224 |
| BTDA-MDI-2,4-TDI/PES (1:2) | 401 | 115 |

1 GPU = $10^{-6}$ $cm^3$ (STP)/$cm^2$ s (cm Hg)Testing conditions: 50° C., 6996 kPa (1000 psig) feed gas pressure, 10 mol % $H_2$ and 90 mol % of $CH_4$ in the feed.

Example 4

Evaluation of BTDA-MDI-2,4-TDI/PES (1:1), BTDA-MDI-2,4-TDI/PES (1:2), BTDA-MDI-2,4-TDI and PES Hollow Fiber Membranes for $CO_2/CH_4$ Separation The BTDA-MDI-2,4-TDI/PES (1:1), BTDA-MDI-2,4-TDI/PES (1:2), BTDA-MDI-2,4-TDI and PES hollow fiber membranes prepared in Example 1, Example 2, Comparative Example 1, and Comparative Example 2, respectively, were tested for $CO_2/CH_4$ separation at 50° C. under 6651 kPa (950 psig) feed gas pressure with 10 mol % of $CO_2$ and 90 mol % of $CH_4$ in the feed and the feed was introduced to the hollow fiber membrane modules from the shell side. The results are shown in Table 2. It can be seen from Table 2 that the PES hollow fiber membrane is defective with poor $CO_2/CH_4$ selectivity. Both BTDA-MDI-2,4-TDI/PES (1:1) and BTDA-MDI-2,4-TDI/PES (1:2) hollow fiber membranes prepared from a blend of BTDA-MDI-2,4-TDI polyimide and PES showed higher $CO_2$ permeances and higher $CO_2/CH_4$ selectivities than the BTDA-MDI-2,4-TDI polyimide hollow fiber membrane without PES blending.

TABLE 2

BTDA-MDI-2,4-TDI/PES (1:1), BTDA-MDI-2,4-TDI/PES (1:2), BTDA-MDI-2,4-TDI and PES hollow fiber membranes for $CO_2/CH_4$ separation

| Membrane | $CO_2$ permeance (GPU) | $CO_2/CH_4$ selectivity |
|---|---|---|
| PES | 90 | 1.3 |
| BTDA-MDI-2,4-TDI | 57 | 24.7 |
| BTDA-MDI-2,4-TDI/PES (1:1) | 93 | 28.4 |
| BTDA-MDI-2,4-TDI/PES (1:2) | 145 | 25.3 |

1 GPU = $10^{-6}$ $cm^3$ (STP)/$cm^2$ s (cm Hg)Testing conditions: 50° C., 6651 kPa (950 psig) feed gas pressure, 10 mol % $CO_2$ and 90 mol % of $CH_4$ in the feed.

Specific Embodiments

While the following is described in conjunction with specific embodiments, it will be understood that this description is intended to illustrate and not limit the scope of the preceding description and the appended claims.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated, and wherein n is an integer from 20 to 2000.

A first embodiment of the invention is a hollow fiber membrane comprising a blend of polyethersulfone and a polyimide comprising a plurality of repeating units of formula (I)

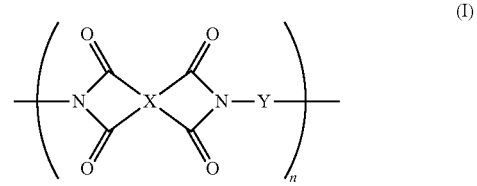

wherein X is

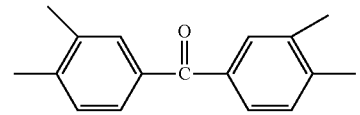

or a mixture of

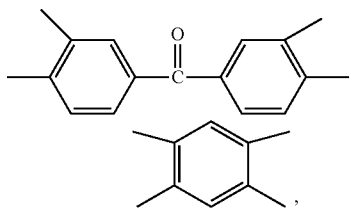

and wherein Y is a mixture of

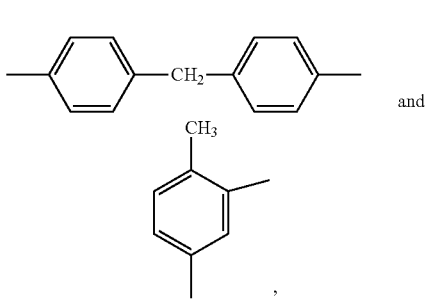

a mixture of

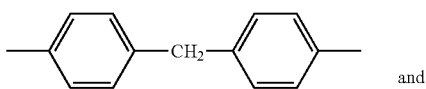

and

-continued

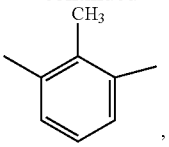

or a mixture of

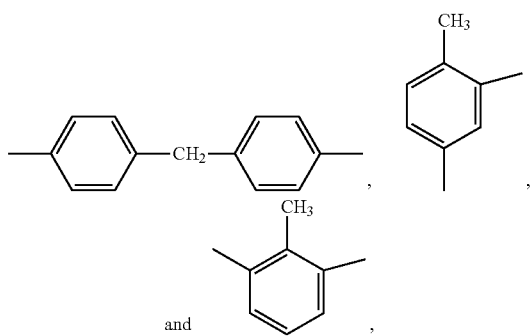

and and wherein n is an integer from 20 to 2000. An embodiment of the invention is one, any or all of prior embodiments in this paragraph up through the first embodiment in this paragraph wherein the polyimide and polyethersulfone are in a weight ratio from 5:1 to 1:5. An embodiment of the invention is one, any or all of prior embodiments in this paragraph up through the first embodiment in this paragraph wherein X is

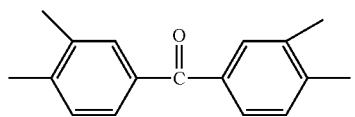

and wherein Y is a mixture of

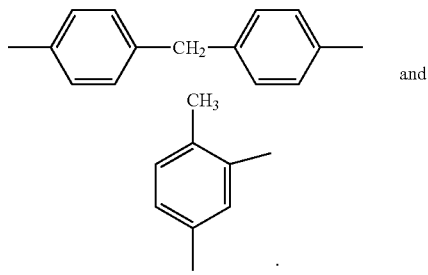

An embodiment of the invention is one, any or all of prior embodiments in this paragraph up through the first embodiment in this paragraph wherein X is

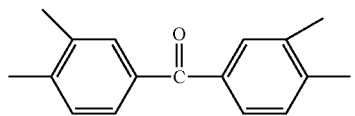

and wherein Y is a mixture of

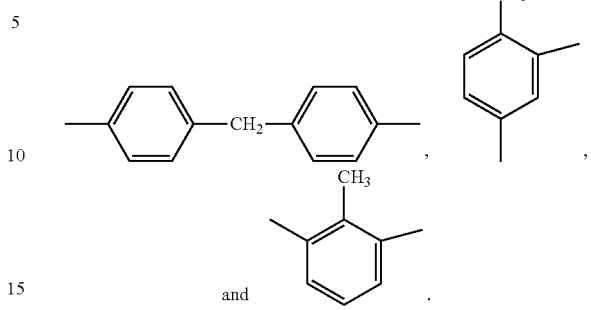

and

An embodiment of the invention is one, any or all of prior embodiments in this paragraph up through the first embodiment in this paragraph wherein there is an asymmetric integrally skinned membrane structure comprising a thin selective skin layer on top of a porous support layer. An embodiment of the invention is one, any or all of prior embodiments in this paragraph up through the first embodiment in this paragraph wherein said membrane has a $H_2$ permeance of between 160 to 400 GPU and a $H_2/CH_4$ selectivity of from 100 to 220 at 50° C. under 6996 kPa feed pressure with 10 mol % $H_2$ and 90 mol % $CH_4$ in the feed. An embodiment of the invention is one, any or all of prior embodiments in this paragraph up through the first embodiment in this paragraph wherein the membrane has a $CO_2$ permeance of between 50 to 160 GPU and a $CO_2/CH_4$ selectivity of from 20 to 28 at 50° C. under 6651 kPa feed pressure with 10 mol % $CO_2$ and 90 mol % $CH_4$ in the feed. An embodiment of the invention is one, any or all of prior embodiments in this paragraph up through the first embodiment in this paragraph wherein the membrane is further comprising a coating with a material selected from a polysiloxane, a fluoropolymer, a thermally curable silicone rubber, or a UV radiation curable silicone rubber. An embodiment of the invention is one, any or all of prior embodiments in this paragraph up through the first embodiment in this paragraph wherein the membrane is further cross-linked via UV radiation.

A second embodiment of the invention is a process for separating at least one gas or vapor from a mixture of gases or vapors, the process comprising (a) providing a polyimide/polyethersulfone blend hollow fiber membrane which is permeable to the at least one gas or vapor; (b) contacting the mixture of gases or vapors to one side of the membrane to cause the at least one gas or vapor to permeate the membrane; and (c) removing from an opposite side of the membrane a permeate gas or vapor composition comprising a portion of the at least one gas or vapor which permeated the membrane, wherein the polyimide/polyethersulfone blend hollow fiber membrane comprises a blend of polyethersulfone and a polyimide comprising a plurality of repeating units of formula (I)

(I)

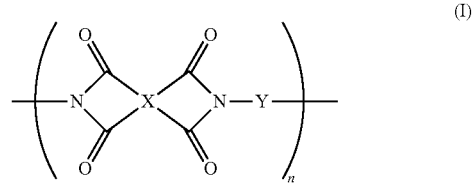

wherein X is

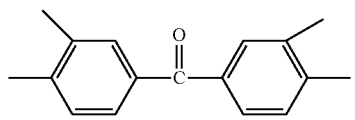

or a mixture of

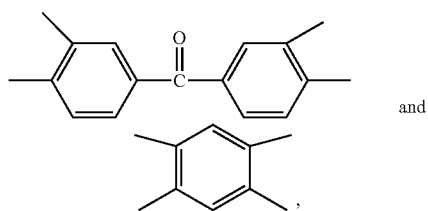

and wherein Y is a mixture of

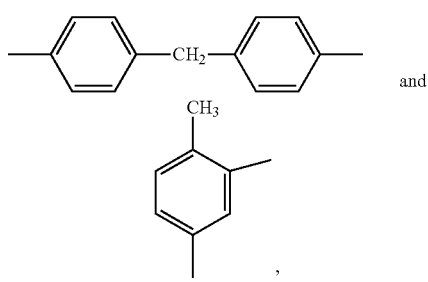

a mixture of

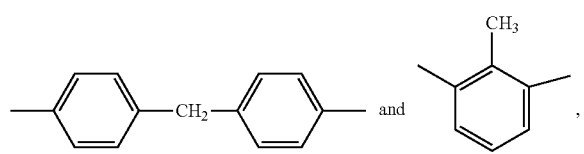

or a mixture of

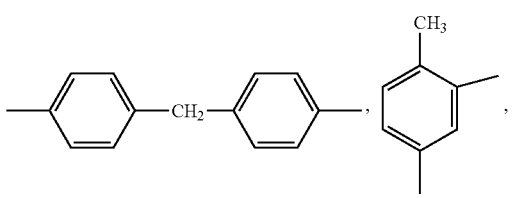

and wherein n is an integer from 20 to 2000.

An embodiment of the invention is one, any or all of prior embodiments in this paragraph up through the second embodiment in this paragraph wherein the mixture of gases or vapors is selected from $CO_2/CH_4$, $CO_2/N_2$, $H_2/CH_4$, $He/CH_4$, $O_2/N_2$, and $H_2S/CH_4$. An embodiment of the invention is one, any or all of prior embodiments in this paragraph up through the second embodiment in this paragraph wherein the mixture of gases is a biogas comprising $CO_2$, $H_2S$, and $CH_4$. An embodiment of the invention is one, any or all of prior embodiments in this paragraph up through the second embodiment in this paragraph wherein the mixture of gases is a natural gas comprising $CO_2$, $H_2S$, and $CH_4$. An embodiment of the invention is one, any or all of prior embodiments in this paragraph up through the second embodiment in this paragraph wherein the mixture of vapors is a gasoline or diesel fuel with sulfur compounds. An embodiment of the invention is one, any or all of prior embodiments in this paragraph up through the second embodiment in this paragraph wherein the polyimide and polyethersulfone are in a weight ratio from 5:1 to 1:5.

A third embodiment of the invention is a method of making a polyimide/polyethersulfone blend hollow fiber membrane comprising (a) dissolving the polyimide and polyethersulfone in a mixture of solvents and non-solvents to form a hollow fiber spinning dope; (b) spinning the hollow fiber spinning dope and a bore fluid simultaneously via a phase inversion method using an annular spinneret to form a nascent hollow fiber membrane with a thin dense selective skin layer on the surface of the membrane and a porous non-selective support layer below the thin dense selective skin layer; (c) solvent exchanging the hollow fiber membrane with methanol; (d) annealing the solvent-exchanged hollow fiber membrane in a hot water bath; and (e) drying the membrane, wherein the polyimide/polyethersulfone blend hollow fiber membrane comprises a blend of polyethersulfone and a polyimide comprising a plurality of repeating units of formula (I)

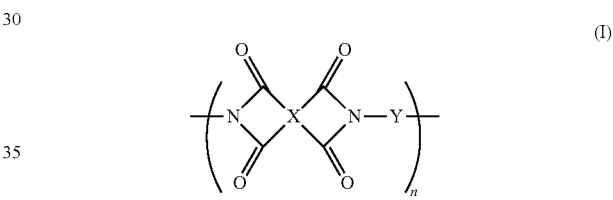

wherein X is

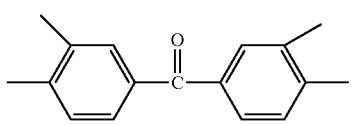

or a mixture of

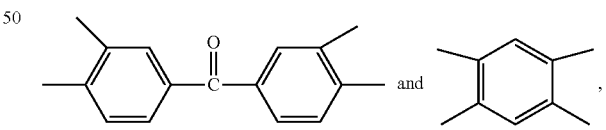

and wherein Y is a mixture of

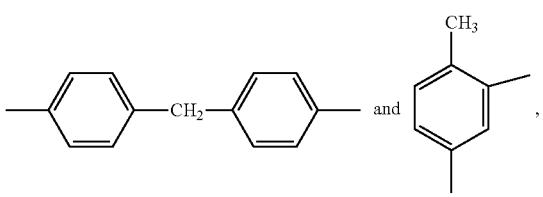

a mixture of

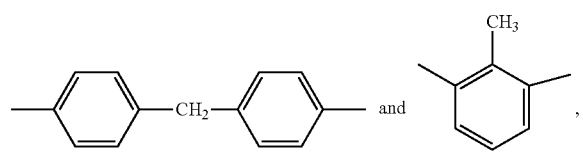

or a mixture of

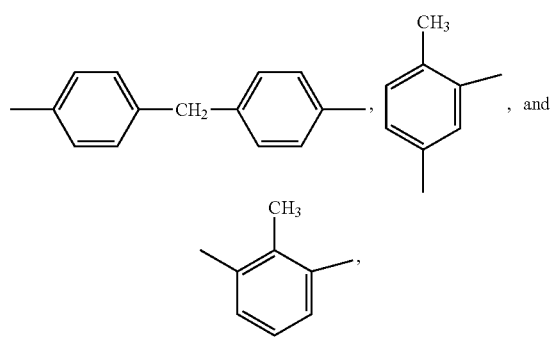

and wherein n is an integer from 20 to 2000. An embodiment of the invention is one, any or all of prior embodiments in this paragraph up through the third embodiment in this paragraph further comprises coating the outside surface of the polyimide/polyethersulfone blend hollow fiber membrane with a thin layer of material selected from a polysiloxane, a fluoropolymer, a thermally curable silicone rubber, and a UV radiation curable silicone rubber. An embodiment of the invention is one, any or all of prior embodiments in this paragraph up through the third embodiment in this paragraph wherein the solvents are NMP and 1,3-dioxolane and the non-solvents are acetone and isopropanol. An embodiment of the invention is one, any or all of prior embodiments in this paragraph up through the third embodiment in this paragraph wherein the solvent exchange with methanol is at room temperature and the total methanol solvent exchange time is in a range of 30 minutes to 5 hours. An embodiment of the invention is one, any or all of prior embodiments in this paragraph up through the third embodiment in this paragraph wherein the membrane drying temperature is in a range of 50° to 100° C.

The invention claimed is:

1. A hollow fiber membrane comprising a blend of polyethersulfone and a polyimide comprising a plurality of repeating units of formula (I)

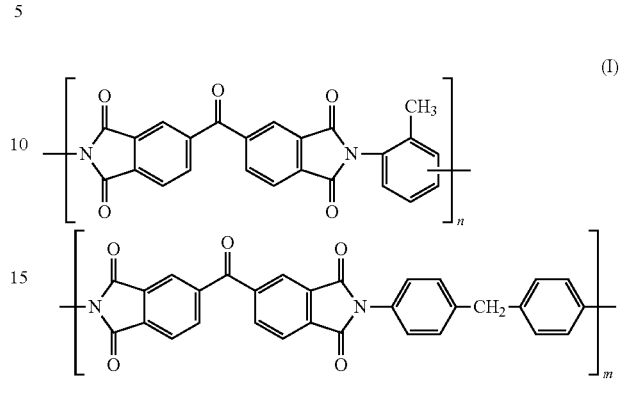

wherein n and m are an independent integer from 20 to 2000.

2. The hollow fiber membrane of claim 1 wherein said polyimide and polyethersulfone are in a weight ratio from 5:1 to 1:5.

3. The hollow fiber membrane of claim 1 wherein said hollow fiber membrane has an asymmetric integrally skinned membrane structure comprising a less than 50nm thin selective skin layer on top of a porous support layer.

4. The hollow fiber membrane of claim 1 wherein said hollow fiber membrane has a $H_2$ permeance of between 160 to 400 GPU and a $H_2/CH_4$ selectivity of from 100 to 220 at 50° C. under 6996 kPa feed pressure with 10 mol % $H_2$ and 90 mol % $CH_4$ in the feed.

5. The hollow fiber membrane of claim 1 wherein said hollow fiber membrane has a $CO_2$ permeance of between 50 to 160 GPU and a $CO_2/CH_4$ selectivity of from 20 to 28 at 50° C. under 6651 kPa feed pressure with 10 mol % $CO_2$ and 90 mol % $CH_4$ in the feed.

6. The hollow fiber membrane of claim 1 further comprising a coating with a material selected from a polysiloxane, a fluoropolymer, a thermally curable silicone rubber, or a UV radiation curable silicone rubber.

7. The hollow fiber membrane of claim 1 is cross-linked via UV radiation.

* * * * *